(12) United States Patent
Nilsson et al.

(10) Patent No.: US 11,906,345 B2
(45) Date of Patent: Feb. 20, 2024

(54) GUIDED WAVE RADAR LEVEL GAUGE WITH EXPLOSION PROOF HOUSING AND FLOATING BARRIER

(71) Applicant: ROSEMOUNT TANK RADAR AB, Mölnlycke (SE)

(72) Inventors: Leif Nilsson, Linköping (SE); Håkan Nyberg, Linköping (SE); Mikael Eriksson, Västervik (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 435 days.

(21) Appl. No.: 17/415,808

(22) PCT Filed: Dec. 20, 2018

(86) PCT No.: PCT/EP2018/086257
§ 371 (c)(1),
(2) Date: Jun. 18, 2021

(87) PCT Pub. No.: WO2020/126003
PCT Pub. Date: Jun. 25, 2020

(65) Prior Publication Data
US 2022/0049985 A1 Feb. 17, 2022

(51) Int. Cl.
*G01F 23/284* (2006.01)
*H02H 9/00* (2006.01)

(52) U.S. Cl.
CPC .......... *G01F 23/284* (2013.01); *H02H 9/008* (2013.01)

(58) Field of Classification Search
None
See application file for complete search history.

(56) References Cited

U.S. PATENT DOCUMENTS

| 2004/0066324 | A1* | 4/2004 | Haynes ................... G01S 13/88 342/124 |
| 2004/0085240 | A1 | 5/2004 | Faust |
| 2006/0001567 | A1 | 1/2006 | Nilsson |
| 2008/0074309 | A1 | 3/2008 | Nilsson |

(Continued)

FOREIGN PATENT DOCUMENTS

CN 207636147 U 7/2018

OTHER PUBLICATIONS

"AN9003—A Users Guide to Intrinsic Safety", Cooper Crouse Hinds, Article, retrieved Sep. 25, 2012, 20 pages.

(Continued)

*Primary Examiner* — Whitney Moore
(74) *Attorney, Agent, or Firm* — Westman, Champlin & Koehler, P.A.

(57) ABSTRACT

A guided wave radar level gauge comprising a housing providing explosion proof protection and having an intrinsically safe output, a transmission line probe connected to the IS output. The housing encloses radar level gauge circuitry which is incompatible with intrinsic safety requirements, a microwave unit connected to the IS output, an electrical barrier connected between the RLG circuitry and the microwave unit, the electrical barrier having a barrier ground potential which is independent from the grounded housing wall, and a set of blocking capacitors connected between the microwave unit and the IS output.

13 Claims, 4 Drawing Sheets

(56) References Cited

U.S. PATENT DOCUMENTS

| | | | |
|---|---|---|---|
| 2016/0146924 A1* | 5/2016 | Williams | G01S 13/88 |
| | | | 342/124 |
| 2016/0262254 A1 | 9/2016 | Meijer | |
| 2018/0010948 A1 | 1/2018 | Edvardsson et al. | |
| 2019/0101429 A1* | 4/2019 | Kleman | G01F 23/284 |
| 2020/0393285 A1* | 12/2020 | Eriksson | G01S 7/03 |
| 2021/0088372 A1* | 3/2021 | Eriksson | G01S 13/103 |

OTHER PUBLICATIONS

European International Search Report and Written Opinion for International Application No. PCT/PCT/EP2018/086257, dated Aug. 6, 2019, 16 pages.

* cited by examiner

GUIDED WAVE RADAR LEVEL GAUGE WITH EXPLOSION PROOF HOUSING AND FLOATING BARRIER

CROSS-REFERENCE TO RELATED APPLICATION

This Application is a Section 371 National Stage Application of International Application No. PCT/EP2018/086257, filed on Dec. 20, 2018 and published as WO 2020/126003 A1 on Jun. 25, 2020, in English, the entire contents of which are hereby incorporated by reference in their entireties.

FIELD OF THE INVENTION

The present invention relates to a radar level gauge having an explosion proof (e.g. Ex-d) compartment with an intrinsically safe (e.g. Ex-ia) connection. Such an explosion proof compartment with an IS connection is particularly desired in a guided wave radar (GWR) level gauge.

BACKGROUND OF THE INVENTION

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, which is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

The distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface. The latter type of systems is generally referred to as being of the FMCW (Frequency Modulated Continuous Wave) type.

A radar level gauge system is often mounted on a so-called nozzle at the top of the tank. The nozzle may typically be a pipe that is welded to the tank and fitted with a flange at its upper end to allow attachment of an instrument, such as a radar level gauge system, or a blind flange. In such cases, the probe is typically mechanically connected to the tank at the top of the nozzle, and passes through the nozzle before entering the tank itself. At the top of the nozzle, the probe may be electrically connected to the transceiver of the radar level gauge system through a feedthrough that passes through the tank boundary.

In some applications, an RLG is used in a hazardous environment, e.g. in connection to a tank with flammable and explosive gases and liquids. In such applications, the RLG must be designed to avoid igniting explosions, and for this there are essentially two different approaches, with associated norms and safety regulations.

According to one approach, the RLG has an "explosion proof" housing (sometimes referred to as "flame proof" or "ignition proof"), indicating that regardless of power supply, any explosion in the RLG circuitry will be contained in the RLG housing and not cause any hazard. An example of an international standard for explosion proof protection is IEC 60079-1. An explosion proof housing is sometimes referred to as an Ex-d compartment.

Inside the tank, explosion proof is not a sufficient approach. Instead, the circuitry of the RLG needs to be designed to be "intrinsically safe" (IS), i.e. available electrical and thermal energy in the circuitry is restricted such that ignition of a hazardous atmosphere (explosive gas or dust) cannot occur, even under worst case conditions. For details of the IS concept, reference is made to "AN9003—*A Users Guide to Intrinsic Safety*", Cooper Crouse Hinds, *Retrieved* 25 *Sep.* 2012. Examples of norms for intrinsic safety are IEC 610079-0 and IEC 610079-11.

For a non-contact RLG, i.e. an RLG emitting electromagnetic signals by means of a directional antenna, the RLG may be separated from the tank interior by a microwave window. For such RLGs, it may therefore be sufficient to place the RLG in an explosion proof housing. For guided wave radar (GWR), however, where the probe extends into the tank interior, explosion proof is not sufficient, and GWR level gauges are therefore typically designed to be intrinsically safe.

The interface between IS circuitry and a non-IS power supply is referred to as an IS-barrier, which serves to "clamp" the individual signals with respect to voltage and current. A conventional IS-barrier is typically arranged at the power connection of the radar level gauge, and involves fuses to protect from significant power surges, Zener diodes (typically three in parallel) to limit the voltage, and resistors to limit the current. Unfortunately, when a radar level gauge with such an IS barrier is placed on a 4-20 mA control loop, where the current may be as high as 20 mA, the resistors in the barrier will cause a voltage drop which deteriorates the energy budget.

In order to avoid such problems, at least part of the RLG circuitry can instead be placed in an explosion proof housing (referred to as an Ex-d housing). However, at least for a GWR level gauge, the housing must be provided with an intrinsically safe (IS) connection (referred to as an Ex-ia connection, or an "associated is output") in order to enable connection of the probe which is in electrical contact with the tank interior.

Attempts have therefore been made to provide an explosion proof housing without any barrier of the type discussed above but with an intrinsically safe probe connection. One example is shown in US 2018/0010948, where a DC barrier in the form of a capacitive filter is used. The filter here needs to fulfill specific requirements in terms of capacitance and minimum insulation distances in order for the connection to be considered intrinsically safe despite the fact that the signals are not clamped by an IS barrier.

Another approach is to have an IS barrier, but to arrange it inside the explosion proof compartment, between the processing circuitry and the microwave unit. The most obvious design is to connect such an IS-barrier to the grounded housing of the Ex-d compartment. However, due to possible potential differences between the power supply ground and the chassis ground, design of such IS-barriers is challenging, and tends to result in a complex and expensive design with a large number of components.

In order to address these problems, it would be desirable to have a "floating" barrier, i.e. an IS-barrier which is not connected to the grounded housing. The only energy output to the probe will be generated by the microwave unit, and thus inherently limited to IS standards. However, in theory the potential of such a floating barrier may be different than the potential of the tank, thereby allowing DC components between the probe connection and the probe, thus making it incompatible with some IS requirements.

General Disclosure of the Invention

It is an object of the present invention to mitigate the problems mentioned above, and provide an improved intrinsically safe connection of non-IS circuitry arranged in an explosion proof compartment.

According to a first aspect of the invention, this and other objects is achieved by a guided wave radar level gauge for determining the filling level of product in a tank, the gauge comprising a housing with a grounded housing wall providing explosion proof protection, an explosion proof first signal passage in the housing wall, the first signal passage configured to be connected to an external power supply, an explosion proof second signal passage in the housing wall, the second signal passage providing an intrinsically safe (IS) output, and a transmission line probe connected to the IS output, the probe being adapted to direct a microwave transmit signal toward the product and return reflections thereof from a surface of the product. The housing encloses radar level gauge (RLG) circuitry which is incompatible with intrinsic safety requirements, a microwave unit connected to the IS output, the HF unit configured to generate and transmit an microwave transmit signal $S_T$ and receive a microwave return signal $S_R$ reflected from the tank, an electrical barrier connected between the processing circuitry and the microwave unit, the electrical barrier preventing energy or voltages incompatible with IS requirements from reaching the transceiver, the electrical barrier having a barrier ground potential which is independent from the grounded housing wall, and a set of blocking capacitors connected between the microwave unit and the IS output, which blocking capacitors serve to block any DC components.

It is known that under certain conditions, a capacitive filter can fulfill the requirements for a DC barrier. For example, in some applications two serially connected "blocking" capacitors are used as a satisfactory DC barrier. In the context of guided wave radar level gauging, US 2018/0010948 (mentioned above) shows that a capacitive filter which fulfills very specific requirements used as a DC barrier. By "DC components" is here intended to include DC as well as low frequency components, e.g. having a frequency lower than 100 Hz.

However, it is only the present inventors that have realized that such a DC barrier will in fact be a solution to potential problems related to a floating IS-barrier in an explosion proof compartment of a radar level gauge. According to the present invention, it is thus a novel combination of a floating barrier, on the one hand, and a capacitive connection of the transmission line probe, on the other hand, that achieves the above mentioned object.

By "floating" is here intended that the barrier potential is independent of the potential of the (grounded) housing. The word "independent" should of course be interpreted as relating to realistic conditions. One way to accomplish such independence is to galvanically separate the floating barrier form the housing wall. However, complete galvanic separation may not be necessary, and for example the leakage current through a blocking capacitor may typically be disregarded.

In this context, it is noted that the radar level gauge application is unusual, as it does not require any DC component. In many other applications where an IS-barrier is required, it would not be acceptable to completely block all DC content. Further, the inventors have realized that also low frequency power from the power supply, typically around 60 Hz, which may pass the floating barrier, will be blocked by the blocking capacitors. The inventors have also realized that any high frequency digital communication present on the power lines (e.g. Fieldbus Foundation) will have an amplitude which is tolerable under IS requirements.

There are several reasons why the RLG circuitry may not comply with IS requirements. For example, the RLG circuitry may include at least one energy store having an energy storage capacity which is incompatible with IS requirements at a voltage applied to the energy store. Such energy storage is typically required in order to intermittently provide sufficient energy for a measurement sweep, when the RLG is connected to a limited power source, such as battery or a two-wire control loop.

It is noted that the IS-barrier is incapable of handling the high frequency signals (e.g. in the GHz area) transmitted and received by a transceiver in the microwave unit, and therefore must be placed upstream the microwave unit.

For pulsed radar level gauging, the transmit signal is a train of pulses, each pulse having a duration in the order of ns, and a pulse repetition frequency in the order of MHz. In this case, the barrier connects electrical power from the RLG circuitry to the microwave unit, and a time expanded tank signal from the microwave unit to the RLG circuitry.

Typically, the RLG circuitry includes a frequency generator, configured to generate a first repetition frequency Tx, defining the pulse repetition frequency of the transmit signal, and a second repetition frequency Rx, for performing time domain reflectometry sampling of the return signal $S_R$. In this case, the barrier connects Rx and Tx clock signals from the RLG circuitry to the microwave unit.

The number of signals passing through the barrier may be reduced by arranging the frequency generator (e.g. a dual oscillator timing circuit, a delay lock loop, DLL, or a phase locked loop, PLL) downstream the barrier. In that case, the clock signals are generated on the microwave unit side, and do not need to pass the barrier. A drawback with this approach is that the frequency generator requires more power, thus causing a larger voltage drop across the barrier. Such a voltage drop increases the minimum voltage required to operate the RLG, sometimes referred to as "lift-off voltage". This voltage is an important design parameter in many applications where power is a limited resource (e.g. RLG powered by a two-wire control loop or internal battery).

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

An embodiment of the present invention will now be disclosed with reference to a pulsed radar level gauge. In the context of radar level gauging, a pulsed system determines the distance to the surface of the product contained in the tank based on the difference in time (time-of-flight) between transmission of a pulse and reception of its reflection at the surface of the product. Most pulsed radar level gauge systems employ Time Domain Reflectometry (TDR), which provides a time expansion of the (extremely short) time-of-flight. Such TDR radar level gauge systems generate a transmit pulse train having a first pulse repetition frequency Tx, and a reference pulse train having a second pulse repetition frequency Rx that differs from the transmitted pulse repetition frequency by a known frequency difference $\Delta f$. This frequency difference $\Delta f$ is typically in the range of Hz or tens of Hz.

The transmit pulse train is emitted by a propagating device towards the surface of a product contained in a tank, and the reflected signal is received and sampled with the reference pulse train. In the present disclosure, the propagation device is a transmission line probe, and the gauge is referred to as a "guided wave radar" (GWR) level gauge.

At the beginning of a measurement sweep, the transmission signal and the reference signal are synchronized to have the same phase. Due to the frequency difference, the phase difference between the transmission signal and the reference signal will gradually increase during the measurement sweep. This gradually shifting time sampling of the reflected signal will provide a time expanded version of the time-of-flight of the reflected pulses, from which the distance to the surface of the product contained in the tank can be determined.

Figure 1:
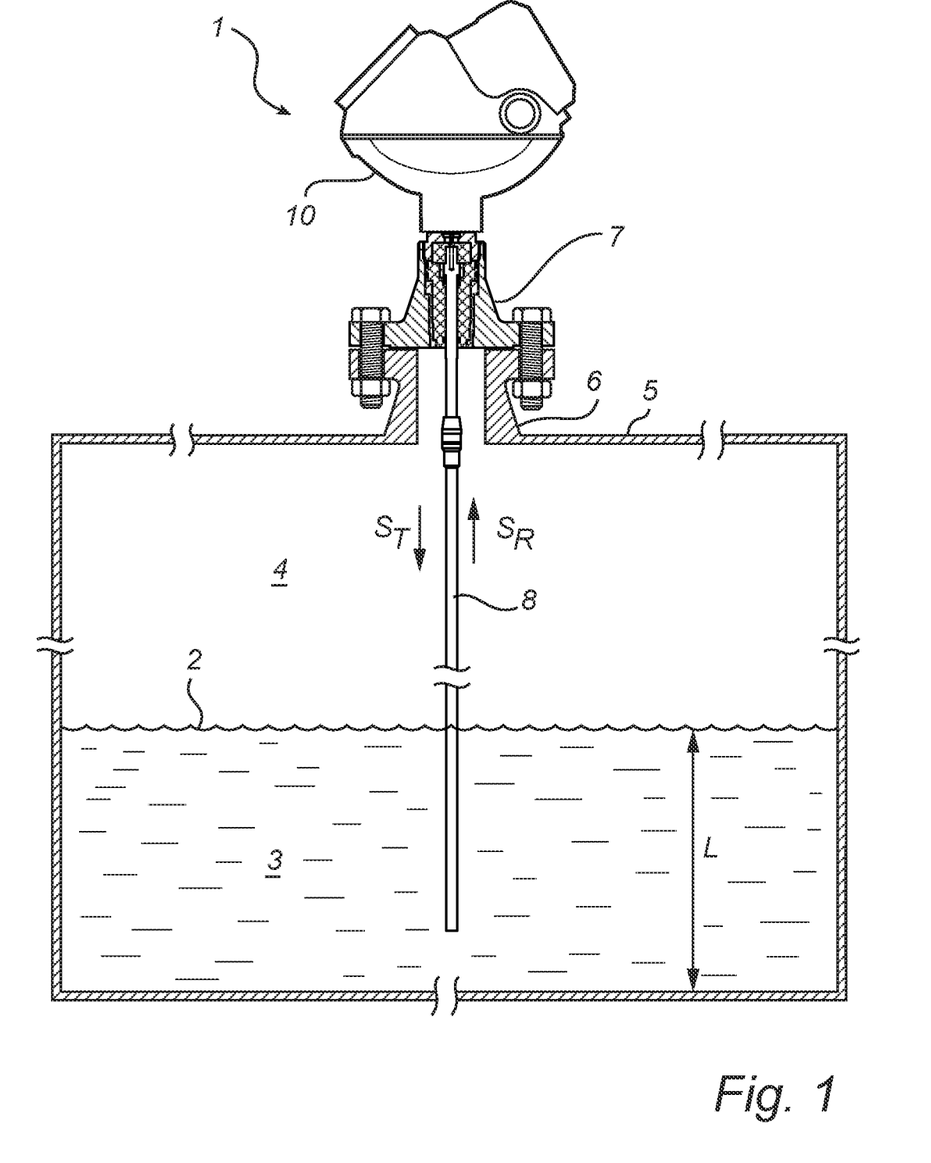
FIG. 1 shows schematically a guided wave radar level gauge.

FIG. 1 shows schematically a guided wave pulsed radar level gauge (RLG) 1 arranged to measure a distance to an interface 2 between two (or more) materials 3, 4 in the tank 5. Typically, the first material 3 is a product stored in the tank, e.g. a liquid such as gasoline, while the second material 4 is air or some other atmosphere. In that case, the RLG will enable detection of the distance to the surface 2 of the content 3 in the tank, and from this determine the filling level L.

The tank 5 is provided with a fastening structure 6 securing the RLG 1 in a measuring position fixed relative the bottom of the tank 5. The RLG 1 includes a feed through structure 7, allowing transmission of signals into and out of the tank. The feed through structure 7 may be arranged to provide process seal, capable of withstanding temperature, pressure, and any chemicals contained in the tank.

The RLG 1 further comprises a transmission line probe 8 arranged to allow propagation of the transmit signal $S_T$ towards the surface 2, and to return a reflected signal $S_R$ resulting from a reflection of the transmit signal at a surface 2 of the product 3. The probe 8 is connected to the transceiver (see FIG. 2) via the feed through structure 7 and extends from the RLG 1 to the bottom of the tank 5. Electromagnetic waves transmitted along the probe 8 will be reflected by any interface 2 between materials in the tank, and the reflection will be transmitted back to the transceiver via the feed through structure 7. The probe can be e.g. a coaxial wire probe, a twin wire probe, or a single wire probe (also referred to as a surface wave guide).

Figure 2:
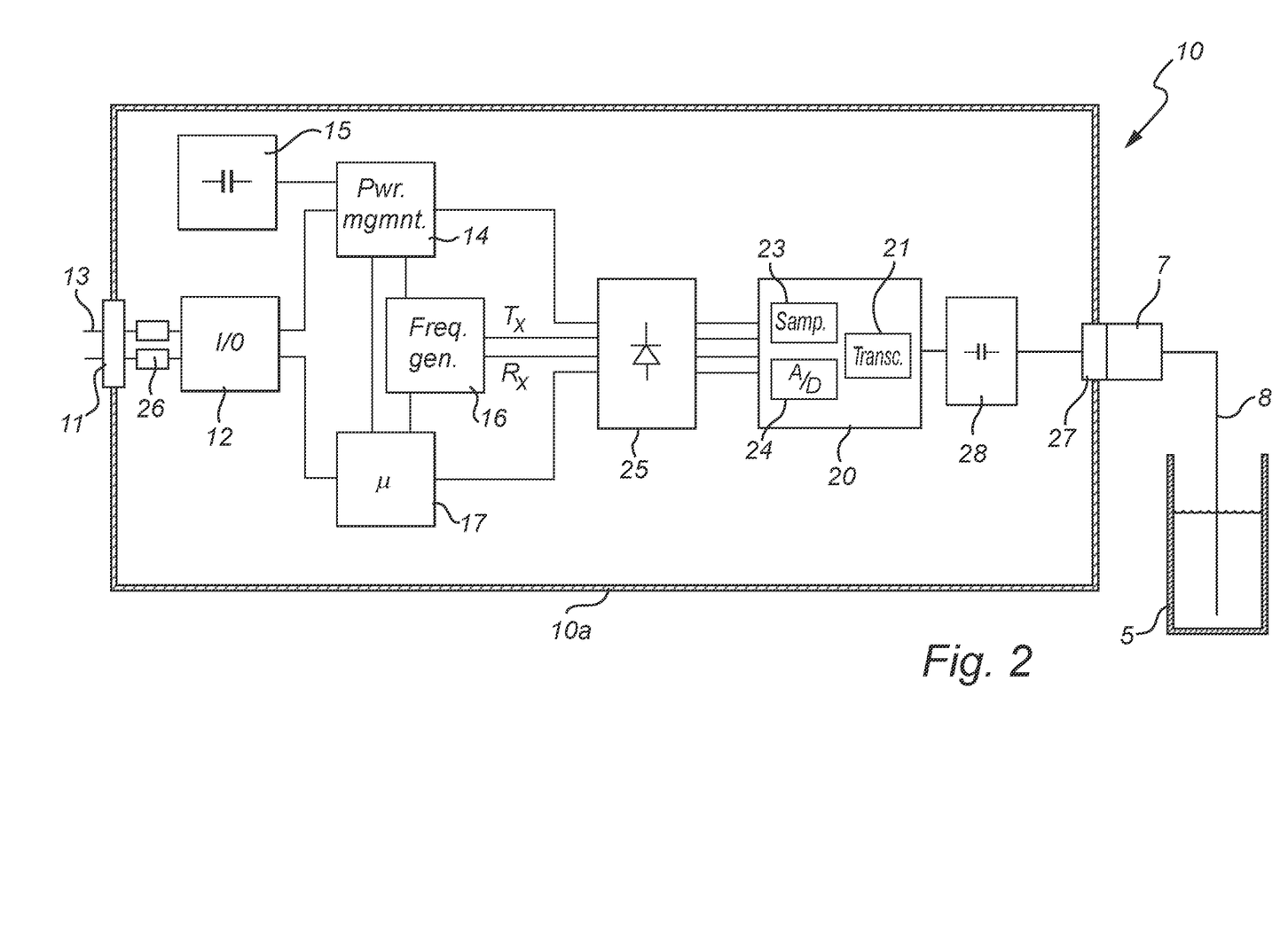
FIG. 2 shows a block diagram of the circuitry in the explosion proof housing of the gauge in FIG. 1, according to an embodiment of the present invention.

A housing 10 is secured to the feed through structure 7, and houses the electrical components of the RLG 1. The housing 10 is here designed to fulfill the requirements for "explosion proof" enclosure, e.g. as specified in IEC 60079-1. With reference to FIG. 2, the circuitry enclosed in the housing will be described in more detail.

A first (explosion proof) signal passage 11 provides external access to a signal/power circuitry 12 which is configured to receive operating power and allow communicating measurement data externally of the RLG 1. In the illustrated example, the signal passage 11 and signal/power circuitry 12 provide a two-wire interface, and may be connected e.g. to a 4-20 mA control loop 13. The current in the loop may correspond to an analogue measurement value (e.g. indicating the filling level L). Alternatively, digital data may be sent across the two-wire loop, using an appropriate protocol such as HART.

The interface 11, 12 is connected to a power management circuitry 14 which is configured to receive and distribute power to the circuitry in the housing 10. The power management circuitry may be connected to an energy store 15, e.g. a capacitance, configured to store energy such that power exceeding the power available from the interface 11, 12, may intermittently be made available. This is particularly useful when using a two-wire control loop with limited current. The power management circuitry 14 may then "scavenge" available power that is not required for immediate operation, and store it in the energy store 15. This stored energy may then be used during a measurement sweep.

The housing 10 further encloses a frequency generator 16 for generating a Tx frequency pulse train and an Rx frequency pulse train. As an example, suitable Tx and Rx frequencies are in the range 0.5-10 MHz, typically 1-2 MHz. Tx is typically greater than Rx, although the opposite relationship is also possible. A critical aspect is the difference between the TX and Rx frequencies, which needs to be several orders of magnitude smaller than the Tx and Rx frequencies. As an example, the difference frequency is in the order of Hz, smaller than 15 Hz, although a larger difference frequency may also be compatible with the technology.

The housing further encloses an A/D converter 24 to A/D-convert a TDR signal into a digital TDR signal, and processing circuitry 17 for determining the distance based on the digital TDR signal. The circuitry 17 is provided with software for analyzing the TDR signal in order to determine a process variable in the tank, typically the level L of the surface 2. The processing circuitry may include a microprocessor (MCU), a FLASH memory for storing program code, a ROM (e.g. an EEPROM) for storing pre-programmed parameters, and a RAM for storing variable parameters.

To the right in FIG. 2 is a high frequency (HF) unit 20, comprising various circuitry for generating, transmitting and receiving microwave signals, and also for sampling the return signal to obtain a time expanded TDR signal. The HF unit 20 is connected to a second (explosion proof) signal passage, serving as a output27 to which the probe 8 is connected via the tank feedthrough 7.

More specifically, the HF unit includes a transceiver 21 configured to generate a transmit signal in the form of a pulse train having a pulse repetition frequency equal to the Tx frequency. The pulses may be DC pulses or be modulated by a carrier frequency. The carrier frequency may be in the order of GHz, e.g. 16 GHz or 25 GHz. The duration of the pulses may be in the order of ns, e.g. around 2 ns or less, in order to enable measurement of the relatively short distance between the gauge 1 and the surface 2. The pulses may have average power levels in the order of mW or μW. The transceiver 21 further includes a coupling device allowing the transceiver to transmit the transmit signal to the probe 8 while simultaneously receiving the reflected signal from the probe 8. The coupling device may be some sort of directional coupler, a circulator, or a solid state switch.

The HF unit 20 also includes sampling circuitry 23, configured to sample the return signal $S_R$ with a sampling frequency equal to the Rx frequency in order to provide a time expanded tank signal. The time expanded tank signal, also referred to as a time domain reflectometry (TDR) signal.

The RLG circuitry to the left, including the power management circuitry 14, the frequency generator 16 and the processing circuitry 17, do not necessarily fulfil relevant requirements for intrinsic safety. For example, as mentioned the RLG circuitry may include an energy store 15, configured to store energy provided by the power management circuitry 14 in order to periodically allow an increased power consumption. Indeed, it is because the RLG circuitry is not intrinsically safe that it is enclosed in the explosion proof housing 10. The output 27, on the other hand, which is electrically connected to the probe 8 extending into the tank 5, needs to be intrinsically safe. Therefore, an electric barrier 25 is arranged between the RLG circuitry 14, 16, 17 and the HF unit 20, such that all electric signals between the RLG circuitry 14, 16, 17 and HF unit 20 are connected through the barrier 25.

Examples of international standards for intrinsic safety (IS) are IEC 60079-0 and IEC 60079-11, herewith incorporated by reference. These standards utilizes three levels of protection, 'ia', 'ib' and 'ic', which attempt to balance the probability of an explosive atmosphere being present against the probability of an ignition capable situation occurring. The level 'ia' offers the highest level of protection and is generally considered as being adequately safe for use in the most hazardous locations (Zone 0) because the possibility of two 'faults' and a factor of safety of 1.5 is considered in the assessment of safety. The level 'ib', which is adequately safe with one fault and a factor of safety of 1.5 is considered safe for use in less frequently hazardous areas (Zone 1), and the level 'ic' is assessed in 'normal operation' with a unity factor of safety is generally acceptable in infrequently hazardous areas (Zone 2).

The barrier 25 is configured to "clamp" the individual signals with respect to voltage and current, such that the signals provided to the HF unit 20 comply with relevant requirements for intrinsic safety. For example, the barrier may ensure that the signals comply with the Ex-ia requirements mentioned above. The barrier 25 thus essentially serves as a "safety shunt" in accordance with the IEC 60079-11 standard, and the output 27 can then be referred to as an Ex-ia connection, or an "associated Ex-ia output".

The barrier design may be known per se, and may include (for each signal connected though the barrier) fuses to protect from significant power surges, Zener diodes to limit the voltage, and resistors to limit the current. Optionally, the fuses 26 are not necessarily provided in the barrier 25, but may be located immediately inside the first signal passage 11, as shown in FIG. 2.

The Zener diodes are preferable high speed switching, low diode capacitance (Cd) diodes. As an example, the diode capacitance (Cd) may be less than ten pF, and preferably only a few pF. To achieve the desired voltage across the lines, typically a plurality of Zener diodes in series are required, e.g. three or four. To protect also from back-voltage, a second series of one or several Zener diodes should be connected in antiparallel with the first series, to form a complete voltage clamp. In order to comply with regulations, typically three redundant clamps are placed in parallel.

In the illustrated example, there are four signals connected through the barrier 25. Specifically, a power signal from the power management circuitry 14, and the Tx and Rx signals from the frequency generator 16 are connected to the HF unit 20, while the TDR signal is connected from the HF unit 20 to the processing circuitry 17. Additional signals are possible.

Figure 3:
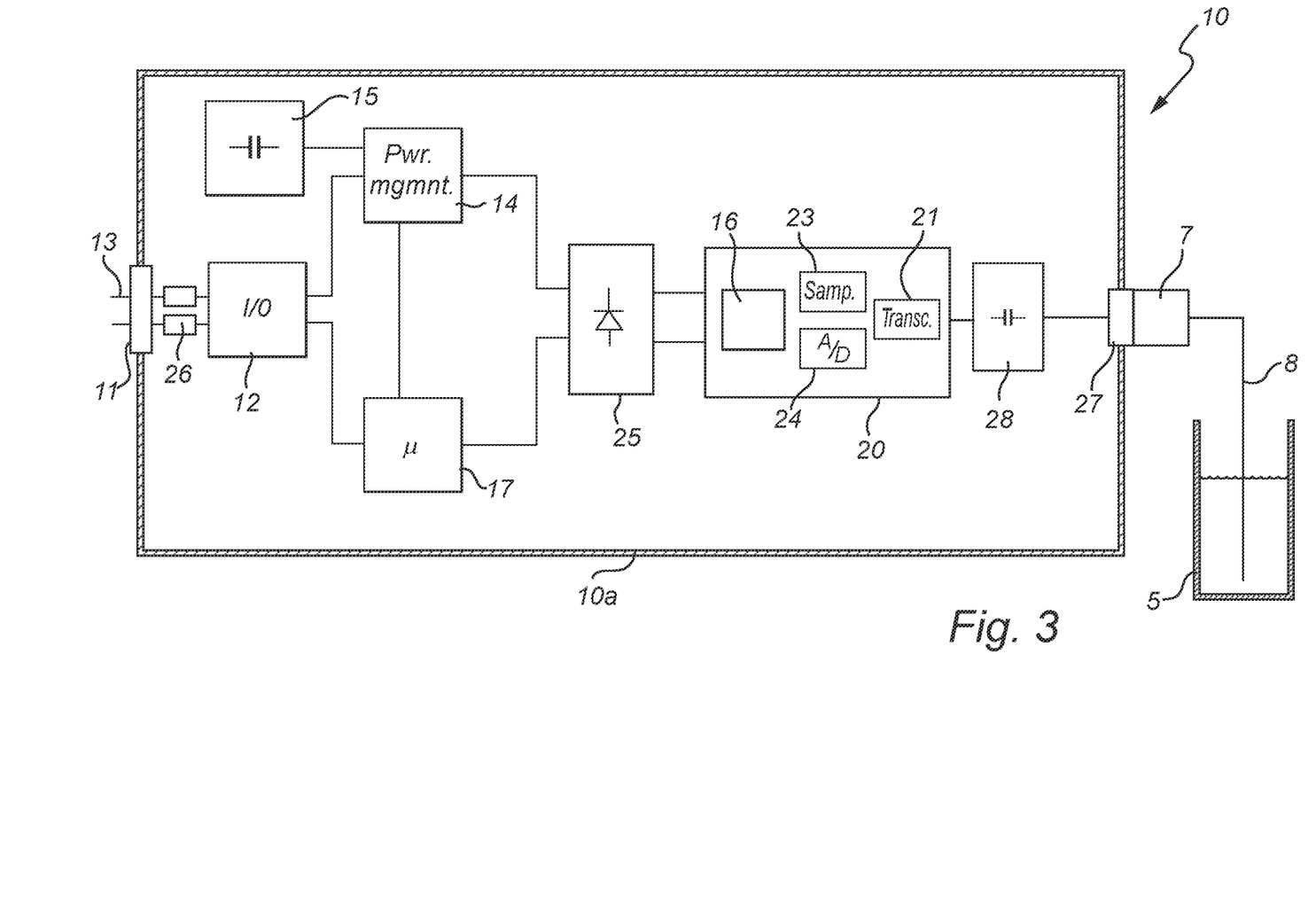
FIG. 3 shows a block diagram of the circuitry in the explosion proof housing of the gauge in FIG. 1, according to a further embodiment of the present invention.

In order to reduce the number of signals that pass through the barrier 25, and thus reduce the complexity of the barrier 25, the frequency generator 16 may be moved to the right side of the barrier 25 (the probe side), as indicated in FIG. 3. A potential drawback with this approach is that more electrical power needs to pass the barrier 25, leading to a greater voltage drop across the barrier 25, and thus a higher "lift-off" voltage. A similar trade-off applies to the A/D-converter 24, which here has been indicated on the left side of the barrier, but also may be placed on the probe side.

It is important to note that the barrier 25 is not grounded, i.e. not connected to the grounded wall (chassis) 10a of the housing 10. The barrier is therefore referred to as a "floating" barrier, in the sense that its potential is floating with respect to the housing. As a consequence, variation between barrier potential and probe potential may cause DC components in the voltage between the HF unit 20 and the probe 8.

For this reason, a DC blocking arrangement 28 is arranged between the HF unit 20 and the signal passage 27. The DC blocking arrangement 28 includes one or several blocking capacitors 29, serving to block any DC components in the signal provided to the probe 8. This DC blocking arrangements will complement the clamping by the barrier 25, by blocking DC and low frequency signals, e.g. originating from the power supply (for example U=250 V, f<60 Hz).

As noted above, in FIGS. 2 and 3 the fuses 26 of the electrical barrier are here located immediately inside the first signal passage 11, i.e. at the connection to the power supply (e.g. two wire bus 13). Such a design may be practical, but it also means that the fuses cannot prevent current generated downstream the fuses from reaching the safety components in the barrier. In particular, capacitances located between the fuses and the safety components may, in the case of an error, store energy and generate large currents, which may damage the safety components in the barrier. When the fuses are placed as in FIGS. 2 and 3, it may therefore be necessary to clamp capacitances arranged between the fuses and the safety components, e.g. using additional Zener diodes.

Figure 4:
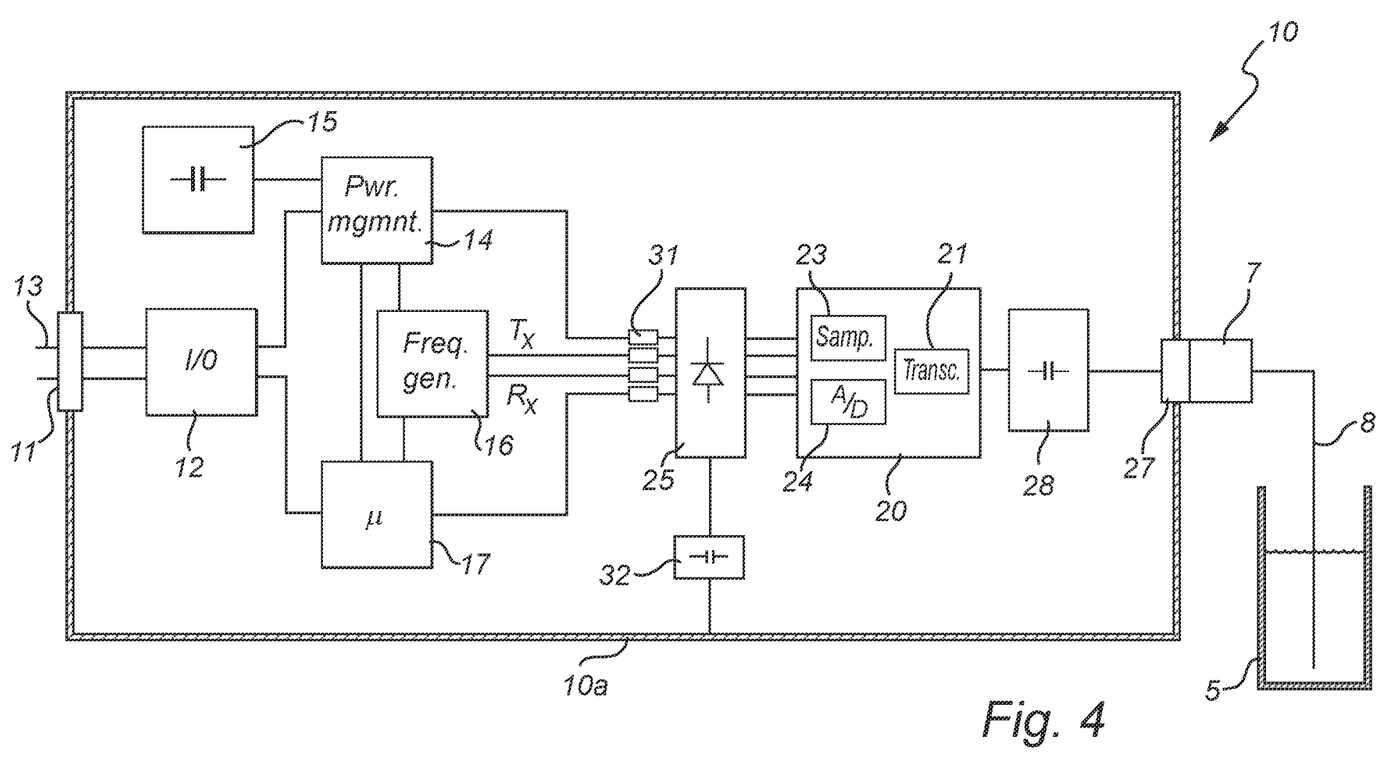
FIG. 4 shows a block diagram of the circuitry in the explosion proof housing of the gauge in FIG. 1, according to a yet another embodiment of the present invention.

Alternatively, as shown in FIG. 4, the fuses 31 may be provided immediately before the safety components in the barrier 25. In this case, one fuse 31 for each signal is required, so four fuses in the illustrated example. In this case, the additional clamping of upstream capacitances is not required. However, the fuses in FIG. 4 cannot prevent current through the (floating) barrier ground. Consequently, an additional set of blocking capacitors 32 may be provided between the barrier 25 and the grounded wall 10a of housing 10.

The person skilled in the art realizes that the present invention by no means is limited to the preferred embodiments described above. On the contrary, many modifications and variations are possible within the scope of the appended claims. For example, additional or different safety components may be included in the barrier than those discussed above.

The invention claimed is:

1. A guided wave radar level gauge for determining the filling level of product in a tank, said gauge comprising:
    a housing with a grounded housing wall providing explosion proof protection,
    an explosion proof first signal passage in said housing wall, said first signal passage configured to be connected to an external power supply,
    an explosion proof second signal passage in said housing wall, said second signal passage providing an intrinsically safe (IS) output,
    a transmission line probe connected to said IS output, said probe being adapted to direct a microwave transmit signal toward said product and return reflections thereof from a surface of said product,
    wherein said housing encloses:
        radar level gauge (RLG) circuitry which is incompatible with intrinsic safety requirements,
        a microwave unit connected to the IS output, said microwave unit configured to generate and transmit an microwave transmit signal $S_T$ and receive a microwave return signal $S_R$ reflected from the tank,
        an electrical barrier connected between the RLG circuitry and the microwave unit, said electrical barrier preventing energy or voltages incompatible with IS requirements from reaching said microwave unit, said electrical barrier having a barrier ground potential which is independent from the grounded housing wall, and
        a set of blocking capacitors connected between the microwave unit and the IS output, which blocking capacitors serve to block any DC components.

2. The radar level gauge according to claim 1, wherein said RLG circuitry includes at least one energy store having an energy storage capacity which is incompatible with IS requirements at a voltage applied to the energy store.

3. The radar level gauge according to claim 1, wherein the electrical barrier, for each signal connected through the barrier, includes at least one Zener diode connected between the signal and barrier ground, to limit the voltage to a desired range.

4. The radar level gauge according to claim 1, wherein the electrical barrier, for each signal connected through the barrier, includes a serially connected fuse to protect from significant power surges and a serially connected resistor to limit the current to a desired range.

5. The radar level gauge according to claim 4, further comprising a set of blocking capacitors connected between the barrier ground and the grounded housing wall.

6. The radar level gauge according to claim 1, wherein said RLG circuitry includes:
    processing circuitry configured to determine the distance between a reference position and the surface of the product based on a relationship between the transmit signal and the return signal, and
    signal/power circuitry configured to receive operating power and communicate measurement data.

7. The radar level gauge according to claim 1, wherein said microwave unit includes:
    transceiver circuitry configured to generate and transmit an electromagnetic transmit signal $S_T$ and receive an electromagnetic return signal $S_R$ reflected from the tank.

8. The radar level gauge according to claim 7, wherein the transmit signal is a train of pulses, each pulse having a duration in the order of ns, and a pulse repetition frequency in the order of MHz.

9. The radar level gauge according to claim 8, wherein the barrier connects:
    electrical power from the RLG circuitry to the microwave unit, and
    a time expanded tank signal from the microwave unit to the RLG circuitry.

10. The radar level gauge according to claim 8, wherein the RLG circuitry includes a frequency generator, configured to generate a first repetition frequency Tx, defining the pulse repetition frequency of the transmit signal, and a second repetition frequency Rx, for performing time domain reflectometry sampling of the return signal $S_R$ and
    wherein the barrier connects Rx and Tx clock signals from the RLG circuitry to the microwave unit.

11. The radar level gauge according to claim 1, wherein said intrinsically safe output is adapted to ensure that high frequency energy transmitted through the first signal passage complies with requirements defined in clause 6.6.1 of IEC 60079-0.

12. The radar level gauge according to claim 1, wherein said intrinsically safe output complies with the Ex-ia requirements of IEC 60079-11.

13. The radar level gauge according to claim 1, wherein said compartment and said first and second signal passages comply with Ex-d requirements of IEC 60079-1.

* * * * *